United States Patent

[11] 3,601,488

| [72] | Inventor | Guy Ripart<br>Plessis-Robinson, France |
|---|---|---|
| [21] | Appl. No. | 861,391 |
| [22] | Filed | Sept. 26, 1969 |
| [45] | Patented | Aug. 24, 1971 |
| [73] | Assignee | Compagnie Generale D'Electricite<br>Paris, France |
| [32] | Priority | Sept. 27, 1968 |
| [33] | | France |
| [31] | | 168,042 |

[54] APPARATUS FOR CHECKING THE PROPER OPERATION OF A LASER TELEMETER
7 Claims, 1 Drawing Fig.

[52] U.S. Cl. ............................................. 356/6, 356/5
[51] Int. Cl. ............................................. G01c 3/08, G01c 25/00
[50] Field of Search ............................................. 331/94.5; 343/17.7; 356/4–6

[56] References Cited
UNITED STATES PATENTS
| 2,781,511 | 2/1957 | Pear ............................ | 343/17.7 |
| 2,934,758 | 4/1960 | O'Brien et al ................ | 343/17.7 |
| 3,199,107 | 8/1965 | Mills............................ | 343/17.7 |

OTHER REFERENCES
Hamilton et al.: " The Laser Rangefinder," Electronics and Power, The Journal of the Institution of Electrical Engineers, 12 , Sept. 1966 , pages 318– 322 .

Primary Examiner—Ronald L. Wibert
Assistant Examiner—F. L. Evans
Attorney—Sughrue, Rothwell, Mion, Zinn & Macpeak ABSTRACT: Apparatus for checking the operation of a laser telemeter before it is used, comprising a laser transmitter and a receiver comprising a photomultiplier and a counter characterized particularly by its means for measuring the energy supplied to the discharge circuit connected to the laser and for measuring the laser emission energy, as well as its means for generating an artificial echo signal on an artificial target in order to stop the chronometer in a preselected position corresponding to the distance separating the artificial target from the receiver and its means for stopping the counter before its maximum capacity has been exceeded.

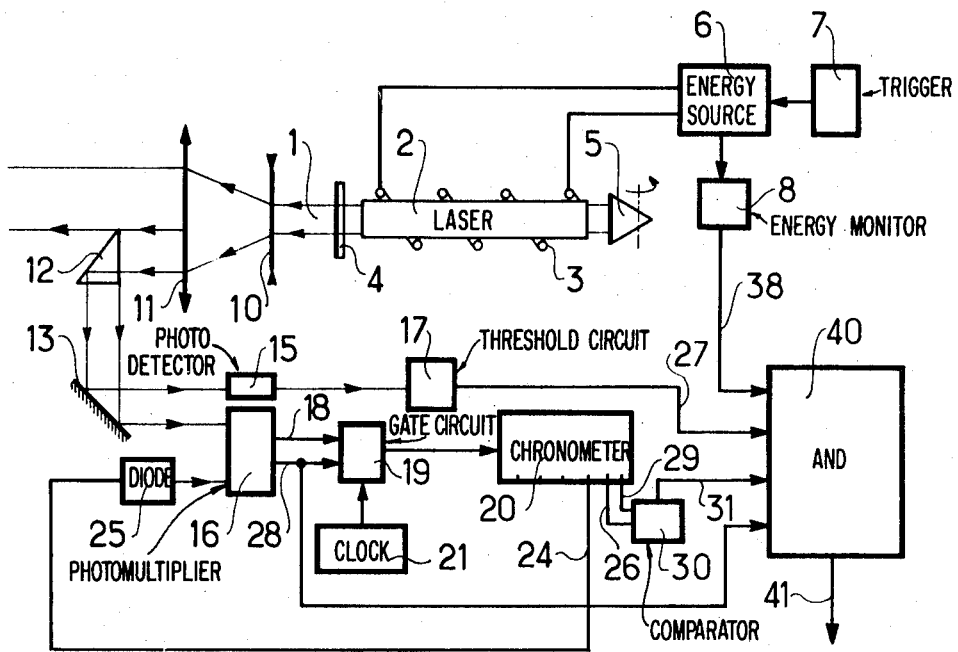

3,601,488

APPARATUS FOR CHECKING THE PROPER OPERATION OF A LASER TELEMETER

BACKGROUND OF THE INVENTION

1. Field of the Invention

The present invention concerns improvements in laser telemeters and relates more particularly to an apparatus for checking the proper operation of a laser telemeter prior to its use.

2. Description of the Prior Art

It is well known that laser telemeters may be employed to measure the distance to a target by chronometry by measuring the time elapsing between the transmission of a pulse by a laser transmitter in the direction of the target and the reception of a luminous echo pulse by a receiver situated in the neighborhood of the transmitter.

SUMMARY OF THE INVENTION

The present invention relates to an apparatus for checking the proper operation of a laser telemeter, which is composed of a laser transmitter, comprising a laser and an energy source for feeding a discharge circuit which triggers the laser effect, and of an associated receiver, comprising a photomultiplier and a chronometer associated with a gate which is rendered conductive by the transmission of a laser pulse and rendered nonconductive by the reception of its echo from a target, distinguished notably by the fact that it comprises an AND circuit having four inputs and one output, a signal being supplied at the output of the AND circuit when a signal is applied to each of its four inputs so as to indicate proper operation of the telemeter, a first input of the AND circuit being connected to means for measuring the energy supplied by the supply source of the discharge circuit and for supplying a signal when a minimum value if reached, a second input of the AND circuit being connected to means for measuring the luminous energy of the transmitted laser pulse and supplying a signal when a threshold value is reached, a third input being connected to the output of the photomultiplier associated with means capable of supplying a signal, called the artificial echo signal, of the luminous pulse at an artificial target delayed in relation to the commencement of the counting in the chronometer of a time corresponding to a chosen distance which represents the position of artificial target, the fourth input of the said AND circuit being connected to a means for comparing the state of the chronometer at the reception of the echo pulse emanating from the photomultiplier in relation to its maximum capacity and capable of emitting a signal when the said maximum capacity is not reached.

In accordance with one feature of the present invention, the means capable of supplying an artificial echo signal comprise a transmitting member connected to an output of the said chronometer, to which a control signal is applied when the state of the chronometer coincides with a predetermined state corresponding to the distance of the artificial target.

One object of the present invention is to make it possible to obtain a sufficient probability of satisfactory operation of a telemeter.

Another object of the present invention is to ascertain the performances of the telemeter before it is used.

Further features and advantages of the present invention will become apparent from the following description with reference to the accompanying drawing, the single FIGURE of which illustrates by way of example only and has no limiting character.

BRIEF DESCRIPTION OF THE DRAWING

The drawing is a block diagram of a laser telemeter system constructed in accordance with the present invention.

DESCRIPTION OF THE PREFERRED EMBODIMENTS

The apparatus according to the invention, as illustrated in the drawing, comprise a source 1 capable of emitting a pulse, this source advantageously being a laser.

The laser is represented by an active rod 2 surrounded by a discharge circuit 3 and disposed between a semitransparent plate 4 and a movable reflecting surface 5. The discharge circuit 3 is connected to an energy supply source 6, for example, in the case of an airborne telemeter, a battery, which is connected to a triggering member 7 controlling the laser effect, under the action of which the supply device 6 supplies its stored energy to the discharge circuit 3.

The supply source 6 is connected to a monitoring circuit 8 for measuring the energy supplied at the triggering of the discharge circuit. Disposed in the path of the beam 1 is an optical magnifier comprising, for example, a divergent lens 10 and a convergent lens 11.

At least one part of the output beam of the convergent lens 11 is deflected by an optical system, such as a prism 12, and simultaneously applied by a reflecting mirror 13 to a photodetector 15, for example, a photodiode, and to a photomultiplier 16. The output of the photodiode 15 is connected to a threshold circuit 17. One output 18 of the photomultiplier 16 is connected to a chronometer 20 through a gate circuit 19, for example, a trigger circuit, which is connected to a clock 21. So as to permit counting of clock pulses, the circuit 19 is opened immediately by the laser pulse which it receives.

The chronometer 20, for example an adjustable electronic chronometer, has a preselected counting state representing a selected distance correspond to the distance of an artificial target.

Immediately on arrival of a signal at the output 18 of the photomultiplier, the circuit 19 opens and the chronometer 20 records the pulses supplied by the clock 21. When the state of the chronometer and the preselected state are in coincidence, the chronometer supplies at its output 24, connected to an electroluminescent diode 25, a control signal which causes the emission of a luminous pulse, called the artificial echo pulse of the emitted laser pulse, from the artificial target. The artificial echo pulse is detected by the photomultiplier 16 which supplies at a second output 28 a signal which renders the gate 19 nonconductive. The pulses supplied by the clock 21 are no longer applied to the chronometer 20; its state, which is blocked immediately when the circuit 19 is closed, is represented, for example, by the output 26 of the chronometer.

The output 26 of the chronometer is connected to a comparator circuit 30 which compares the state of the chronometer when the counting is stopped with its maximum capacity. The comparator 30 may, for this purpose, store the value of said maximum capacity of the chronometer 20, or in a variant, as illustrated, it may be connected to the output 29 of the chronometer at which there appears a signal representing the maximum capacity of the chronometer.

The output 39 of the circuit 8 for measuring the energy supplied to the discharge circuit 3, the output 27 of the threshold circuit 17, the output 28 of the photomultiplier 16 and the output 31 of the comparator are connected respectively to four inputs of an AND circuit 40 which supplies a pulse at its output 41 when a signal is present at each of its inputs.

The above-described apparatus operates as follows:

Immediately after the order to check the correct operation of the telemeter is given by the trigger circuit 7, the energy stored at source 6 is supplied to the discharge tube. The apparatus according to the invention performs the following operations:

a. Monitoring of the energy stored in the supply source 6 of the discharge tube 3. More particularly, in the case of an airborne telemeter, the supply source 6 constitutes an independent energy storage means and it becomes necessary to measure the energy which is capable of being supplied to the discharge tube before the use of the telemeter. This energy is measured by the circuit 8, which supplies a calibrated pulse at its output 38 when this energy is above the energy threshold necessary for supplying the discharge tube in order to produce the triggering of the laser effect.

b. Monitoring the power of the pulse supplied by the laser, This monitoring is effected with the aid of the threshold circuit 17, which receives the signal emanating from the photodetector 15, so as to avoid detection of spurious luminous signals due to the external noises which may reach the receive. This emission power monitoring may be effected with the aid of a digital peak voltmeter which directly gives the peak value of the signal emanating from a standard photodiode situated in the path of the transmission beam. When the emission power is higher than a threshold value corresponding to the maximum value of any noise power, a calibrated signal is set up at the output 27 of the circuit 17.

c. Monitoring the operation of the chronometer 20, The firing of a laser pulse corresponds to the beginning of the counting of the clock pulses supplied to the chronometer 20. After a time corresponding to the predetermined distance of the imaginary target, the chronometer 20 supplies, on coincidence of its counting state with a preselected state, an electric pulse for controlling a standard transmitter consisting of the electroluminescent diode 25. The pulse supplied by the electroluminescent diode 25 detected at the output 28 of the photomultiplier 16 permits the stopping of the counting of the chronometer and of the sensitivity of the receiver for a minimum emission power.

The signal supplied at the output 28 of the photomultiplier closes the gate 19 and causes the counting to stop. The signal set up at the output 26 of the chronometer on stopping of the counting before the maximum capacity of the chronometer is reached indicates the time of transmission of the end-of-emanating information which is given by the closing of the gate 19, and therefore the time of reception of an echo signal must not exceed a time corresponding to the reaching of the maximum capacity of the chronometer or a selected maximum time, the signal which is set up at the output 31 of the comparator 30 before the maximum counting capacity of the clock pulses is reached indicates proper operation of the chronometer.

A signal will therefore appear at the output 41 of the AND circuit 40 when there are applied to its inputs respectively, the signals indicating that a sufficient supply energy has been supplied to the discharge tube, that the emission power is above a chosen threshold, that an artificial echo signal has been emitted and that the counting has stopped before the maximum capacity of the chronometer has been reached.

The presence of each of its signals at the corresponding input of the AND circuit 40 or the presence of the signal at the output of this AND circuit may advantageously be visually displayed by the pilot lamp or any other equivalent means.

By way of example, the pulses supplied by the clock are distance pulses supplied to the chronometer at the rate of one pulse per 5 meters, the preselected state of the chronometer than corresponding to the decoding of the position 5,120 meters, at which distance the imaginary target is situated, i.e., when 1,024 clock pulses have been recorded.

The form of construction of the apparatus according to the invention which has been described and illustrated has been referred to only by way of nonlimiting example. It is obvious that details may be modified and certain means replaced by other equivalent means without departing from the scope of the invention.

I claim:

1. In a laser telemeter system comprising a laser transmitter including a laser, a discharge source and an energy source for supplying energy to said discharge source wherein said discharge source triggers said laser; a receiver including a photomultiplier, a chronometer, having a maximum capacity and a gate coupled between said photomultiplier and said chronometer, said gate being rendered conductive the transmission of a laser pulse and nonconductive by the reception of the echo of said laser pulse from a target, whereby the chronometer measures the time interval between the transmission of said laser pulse and the reception of said echo; the improvement comprising:

a. an AND circuit having at least two inputs and one output wherein the presence of a signal at said output indicates proper operation of said system;

b. first measuring means for measuring the luminous energy of said laser pulse and for producing an output in accordance therewith;

c. means, coupled to said first measuring means, for applying a first signal to one input of said AND circuit when the output of said first measuring means is above a predetermined threshold; and d. comparator means coupled to the output of said chronometer for applying a second signal to a second input of said AND circuit if the output of said chronometer has not reached said maximum capacity when said echo of said laser pulse is received.

2. The system of claim 1 further comprising signal-generating means coupled to said photomultiplier for generating an artificial echo signal delayed in relation to the start of the counting cycle of said chronometer by a delay time corresponding to a selected distance representing the position of an artificial target, said artificial echo signal being applied to a third input of said AND circuit.

3. The system of claim 2 wherein said signal-generating means comprises a transmitter means and means for applying a control signal to said transmitter means when the state of said chronometer corresponds to said delay time, whereby said transmitter means transmits said artificial echo.

4. The system of claim 3 wherein said transmitter means comprises an electroluminescent diode.

5. The system of claim 1 further comprising
a. second measuring means for measuring the energy supplied to said discharge source by said energy source and for producing an output in accordance therewith; and
b. means coupled to said second measuring means for applying a third signal to a third input of said AND circuit when said energy is above a minimum value.

6. The system of claim 1 wherein said first measuring means comprises:
a. a photodiode; and
b. threshold means coupled to said photodiode.

7. The system of claim 6 wherein said threshold means comprises a digital peak voltmeter.